(12) United States Patent
Karimelahi et al.

(10) Patent No.: US 12,541,065 B2
(45) Date of Patent: Feb. 3, 2026

(54) ARRAY-BASED EDGE COUPLER FOR OPTICAL INPUT/OUTPUT

(71) Applicant: Marvell Asia Pte Ltd, Singapore (SG)

(72) Inventors: Samira Karimelahi, Los Gatos, CA (US); Masaki Kato, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 316 days.

(21) Appl. No.: 18/116,227

(22) Filed: Mar. 1, 2023

(65) Prior Publication Data

US 2023/0280550 A1  Sep. 7, 2023

Related U.S. Application Data

(60) Provisional application No. 63/315,099, filed on Mar. 1, 2022.

(51) Int. Cl.
*G02B 6/42* (2006.01)
*G02B 6/30* (2006.01)

(52) U.S. Cl.
CPC .............. *G02B 6/4206* (2013.01); *G02B 6/30* (2013.01); *G02B 6/42* (2013.01)

(58) Field of Classification Search
CPC .......... G02B 6/4206; G02B 6/30; G02B 6/42; G02B 2006/12061; G02B 6/1228; G02B 2006/12147; G02B 2006/12152; G02B 6/12002; G02B 6/12004; G02B 2006/121; G02B 6/125; G02B 6/14; G02B 6/26; G02B 6/268; G02B 6/305; G02B 6/122
See application file for complete search history.

(56) References Cited

U.S. PATENT DOCUMENTS

| | | | |
|---|---|---|---|
| 10,156,678 B2 | 12/2018 | Novack et al. | |
| 2018/0067259 A1 | 3/2018 | Teng et al. | |
| 2019/0384003 A1 | 12/2019 | Painchaud et al. | |
| 2021/0026074 A1* | 1/2021 | Horth | G02B 6/1228 |

FOREIGN PATENT DOCUMENTS

| | | |
|---|---|---|
| CN | 110658586 A | 1/2020 |
| EP | 3671298 A1 | 6/2020 |

OTHER PUBLICATIONS

International Search Report and Written Opinion for PCT Patent Application No. PCT/US2023/014270, mailed May 31, 2023. (13 pages).

Mu et al., "Edge Couplers in Silicon Photonic Integrated Circuits: A Review," Applied Sciences, vol. 10, 1538, Feb. 24, 2020 (29 pages).

* cited by examiner

*Primary Examiner* — John Bedtelyon

(57) ABSTRACT

A photonic integrated circuit (PIC) includes photonic components fabricated on the PIC. One of the photonic components includes an optical coupler configured to optically couple to an optical component. The optical coupler includes waveguide elements arranged in a 2-dimensional array that is configured to provide a first mode having a first shape chosen to match a second shape of a second mode of the optical component.

22 Claims, 14 Drawing Sheets

*FIG. 2A* ← 200
 — 208
 — 204
*FIG. 2B* ← 216
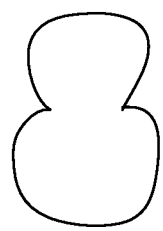
*FIG. 3A* ← 300
 — 308
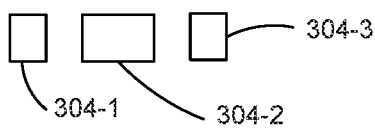
304-1  304-2  304-3
*FIG. 3B* ← 316
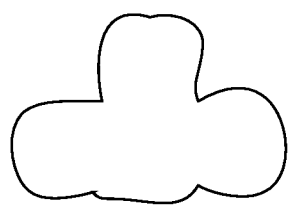
*FIG. 4A* ← 400
 — 308
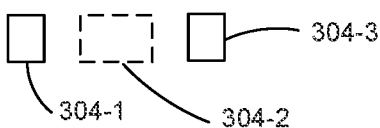
304-1  304-2  304-3
*FIG. 4B* ← 416
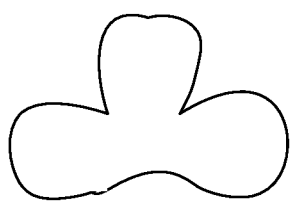
*FIG. 4C*
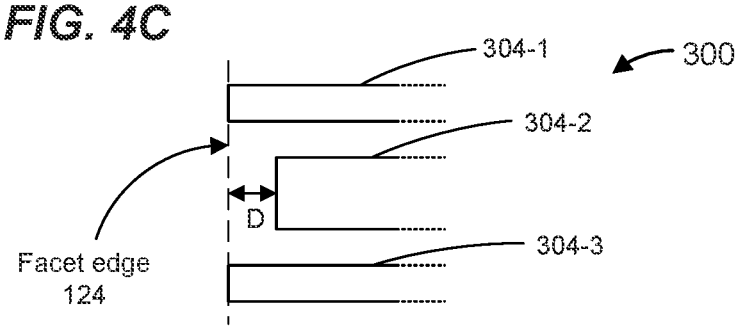
Facet edge 124
304-1
304-2
304-3
← 300
D Facet edge
124

Facet edge
124

ARRAY-BASED EDGE COUPLER FOR OPTICAL INPUT/OUTPUT

CROSS REFERENCES TO RELATED APPLICATIONS

This application claims the benefit of U.S. Provisional Patent App. No. 63/315,099, entitled "Array-Based Edge Coupler for Various Optical Input/Output Beam Profile," filed on Mar. 1, 2022, the disclosure of which is expressly incorporated herein by reference in its entirety.

FIELD OF TECHNOLOGY

This disclosure relates generally to optical communications, and more particularly to optical edge couplers that interface photonic integrated circuits (PICs) with off-chip optical components such as optical fibers, lasers, etc.

BACKGROUND

During this time of growth of Internet technologies and usage, demand for high speed data transmission has increased rapidly. As an example, average internet traffic in 2021 was estimated to exceed 700 terabytes per second. Technologies to support such sustained usage levels will continue to proliferate. Optical transmission of data can support vast amounts of data per channel—often limited more by the rate at which electronics can encode a signal onto the optical channel rather than the bandwidth of the channel itself. Improvements to optical modulation performance will continue to drive adoption of such technologies.

A photonic integrated circuit (PIC) often transfers light to and/or receives light from an optical component such as a laser or an optical fiber. It is common for the PIC to include an edge coupler to transfer light to and/or receive light from the optical component. Misalignment between the optical component and the edge coupler can increase optical loss between the PIC and the optical component.

SUMMARY

In an embodiment, a photonic integrated circuit (PIC) comprises: a plurality of photonic components fabricated on the PIC. The plurality of photonic components includes an optical coupler configured to optically couple to an optical component, the optical coupler having a plurality of waveguide elements arranged in a 2-dimensional array that is configured to provide a first mode having a first shape chosen to match a second shape of a second mode of the optical component.

In another embodiment, a method of manufacturing a PIC includes: fabricating a photonic component on a substrate of the PIC; and fabricating an optical coupler on the substrate of the PIC, the optical coupler being configured to optically couple to an optical component, the optical coupler having a plurality of waveguide elements arranged in a 2-dimensional (2-D) array that is configured to provide a first mode having a first shape chosen to match a second shape of a second mode of the optical component.

BRIEF DESCRIPTION OF THE DRAWINGS

FIGS. 2A-4B are simplified side views of various other example 2-D arrays of waveguide elements that are used in the example PIC of FIG. 1A, according to various other embodiments.

FIG. 4C is a simplified top view of the waveguide elements of the 2-D array of FIG. 4B, showing one waveguide element set back from a facet edge, according to an embodiment.

DETAILED DESCRIPTION

Misalignment between an optical component and an edge coupler of a photonic integrated circuit (PIC) can increase optical loss between the PIC and the optical component. Additionally, an optical mode mismatch between a mode of the optical component and a mode of the edge coupler also increases optical loss between the PIC and the optical component.

In various embodiments described below, an optical coupler (e.g., an edge coupler or another suitable optical coupler) is configured to optically couple to an optical component such as a laser, an optical fiber, etc. The optical coupler includes a plurality of waveguide elements arranged in a 2-dimensional array. In some embodiments, the 2-dimensional (2-D) array is structured to provide a first mode having a first shape chosen to match a second shape of a second mode of the optical component. For example, a quantity of waveguide elements and a positioning of each waveguide element within the 2-D array is selected to provide the first mode having the first shape chosen to match the second shape of the second mode, in some embodiments. At least in some embodiments in which the 2-dimensional array is structured to provide the first mode having the first shape chosen to match the second shape of the second mode, coupling loss is reduced and/or alignment sensitivity is reduced.

Figure 1A:
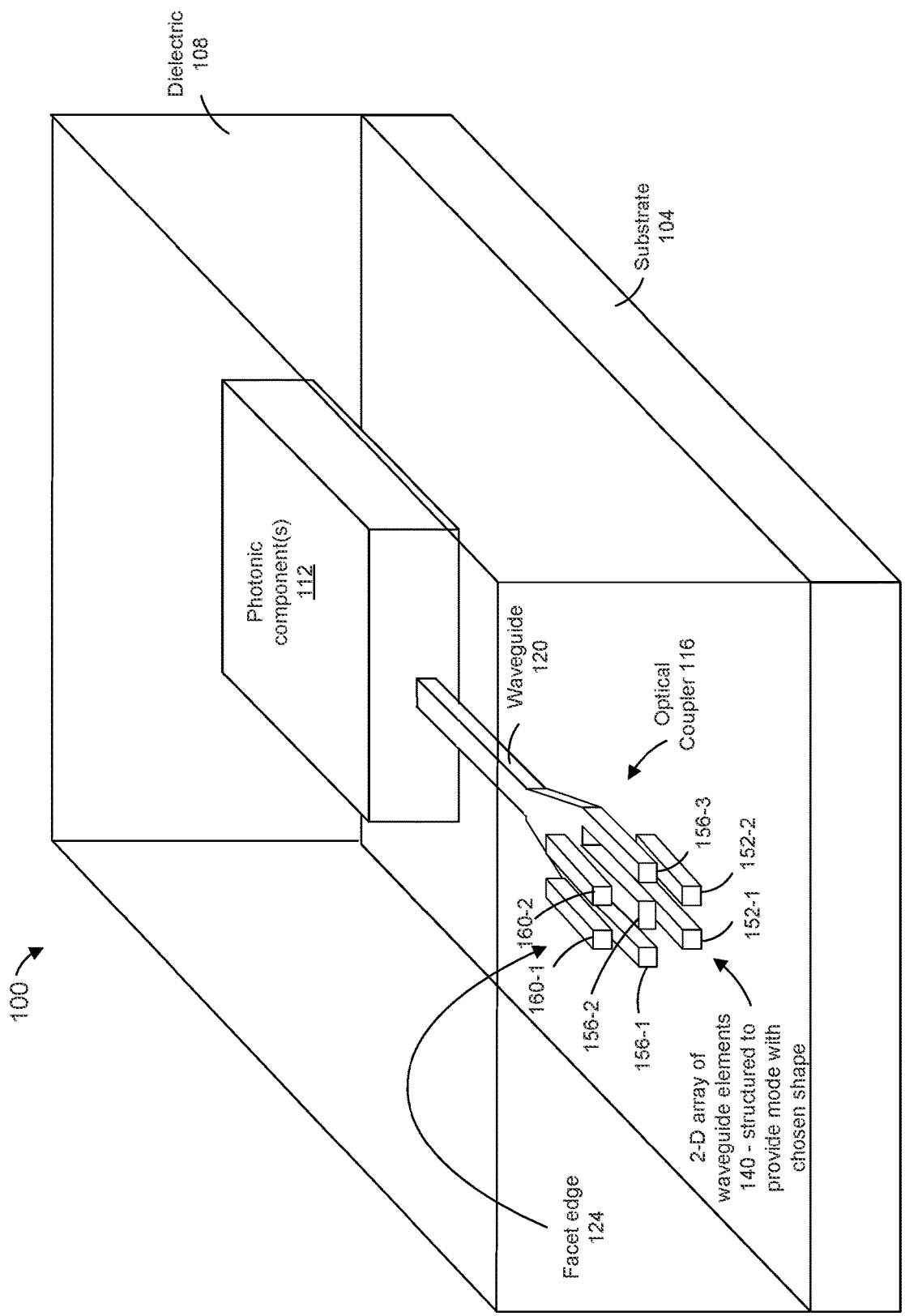
FIG. 1A is a simplified perspective view of an example photonic integrated circuit (PIC) having an optical coupler that includes a 2-dimensional (2-D) array of waveguide elements arranged to provide a chosen shape of an optical mode, according to an embodiment.

FIG. 1A is a simplified perspective view of an example PIC 100, according to an embodiment. In some embodiments, the PIC 100 is used in connection with network communications. For example, the PIC 100 is included in a network device within a communication network, such as i) a network switching device, ii) a computing device, iii) a storage device, etc., in a server farm, a data center, an office complex, an educational institution, a multi-family residence, a single-family residence, etc.

The PIC 100 includes a substrate 104 and a dielectric 108. The substrate 104 comprises a Si substrate or another suitable substrate material. The dielectric 108 comprises $SiO_2$ or another suitable dielectric material. In some embodiments, the PIC 100 also includes a buried oxide (BOX) layer (not shown) between the substrate 104 and the dielectric 108.

The PIC 100 includes one or more photonic components 112, such as one of, or any suitable combination of two or more of, i) an optical multiplexer, ii) an optical demultiplexer, iii) an optical filter, iv) a P-I-N-type diode, v) an optical tuner, vi) one or more waveguides, etc. The PIC 100 also includes an optical coupler 116 that is optically coupled to the one or more photonic components 112 via a waveguide 120. The optical coupler 116 has a first end that coincides with a facet edge 124 of the PIC 100.

Figure 1B:
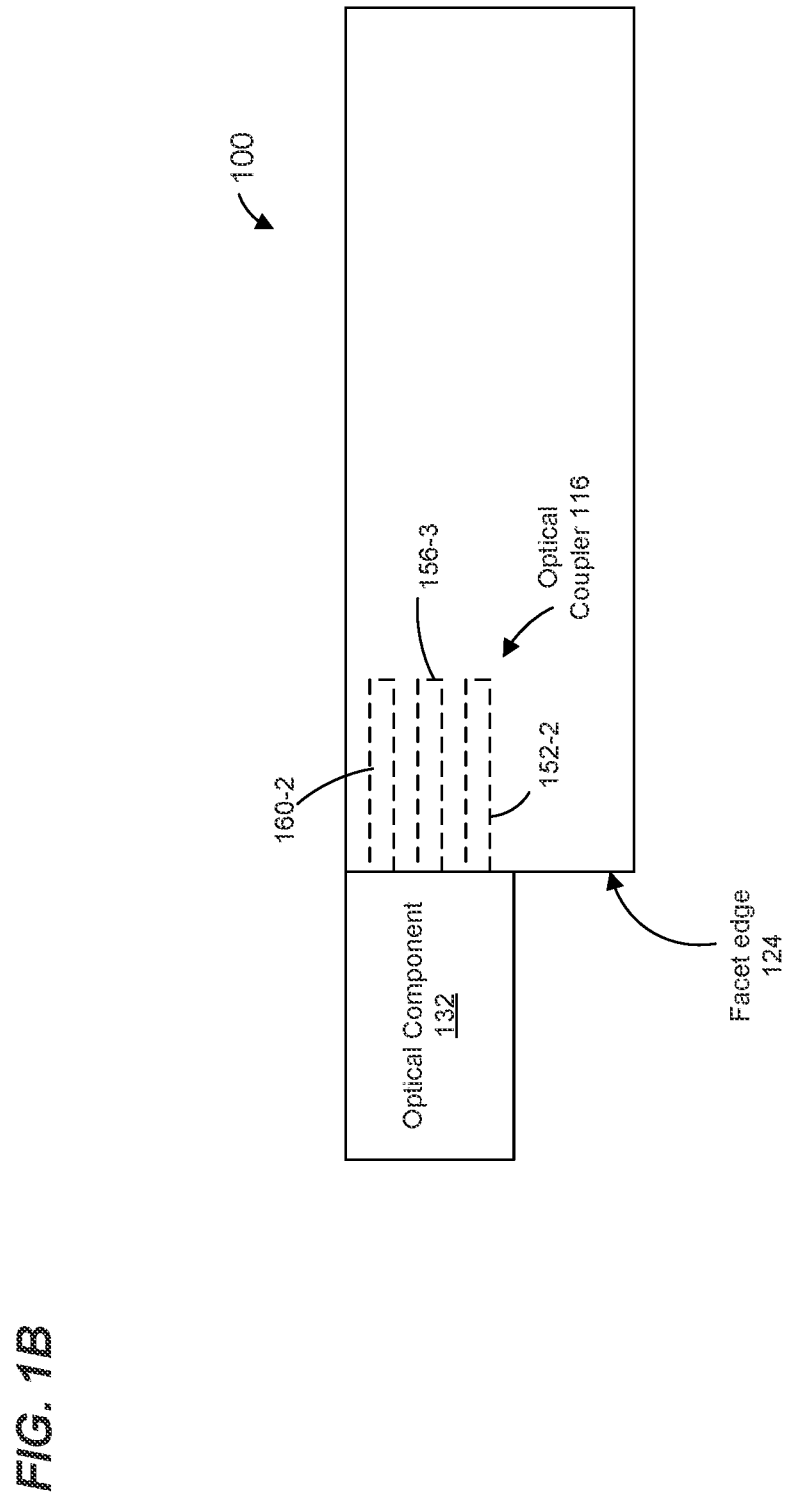
FIG. 1B is a simplified side view of the PIC of FIG. 1A showing another optical component, such as a laser, an optical fiber, etc., that is positioned proximate to a facet edge of the PIC, according to an embodiment.

The optical coupler 116 is configured to optically couple the PIC 100 to another optical component (not shown in FIG. 1A), such as a laser, an optical fiber, etc., that is positioned proximate to the facet edge 124. FIG. 1B is a simplified side view of the PIC 100 showing another optical component 132, such as a laser, an optical fiber, etc., that is positioned proximate to the facet edge 124, according to an embodiment.

Referring again to FIG. 1A, the optical coupler 116 comprises a 2-dimensional (2-D) array 140 of waveguide elements. The 2-D array 140 is structured to provide an optical mode having a chosen shape at or proximate to the facet edge 124. For example, a quantity of waveguide elements within the 2-D array 140 and a positioning of each waveguide element within the 2-D array 140 is selected to provide the optical mode having the chosen shape at or proximate to the facet edge 124, in some embodiments. Generally, the chosen shape of the optical mode of the 2-D array 140 is chosen to match a shape of an optical mode of the other optical component 132 at or proximate to the facet edge 124 in a manner that reduces coupling loss between the optical coupler 116 and the other optical component 132, and/or reduces alignment sensitivity with respect to the optical coupler 116 and the other optical component 132, at least in some embodiments.

The 2-D array 140 comprises waveguide elements that are generally parallel to one another in a direction i) that extends away from the facet edge and ii) that is generally parallel to the substrate 104. The 2-D array 140 comprises a plurality of levels of waveguide elements, including i) a first level of waveguide elements that is lowest among the plurality of levels with respect to the substrate 104 (i.e., the first level is closest to the substrate 104 amongst the plurality of levels); ii) a second level of waveguide elements above the first level (and further from the substrate 104 as compared to the first level); and iii) a third level of waveguide elements that is above the second level (and further from the substrate 104 as compared to the second level). The first level comprises a plurality of waveguide elements 152; the second level comprises a plurality of waveguide elements 156; and the third level comprises a plurality of waveguide elements 160. Each waveguide element 152 in the first level is laterally spaced apart from an adjacent waveguide element 152 in the first level by a suitable lateral distance that is selected to provide the optical mode having the chosen shape at or proximate to the facet edge 124; each waveguide element 156 in the second level is laterally spaced apart from an adjacent waveguide element 156 in the second level by a suitable lateral distance that is selected to provide the optical mode having the chosen shape at or proximate to the facet edge 124; and each waveguide element 160 in the third level is laterally spaced apart from an adjacent waveguide element 160 in the third level by a suitable lateral distance that is selected to provide the optical mode having the chosen shape at or proximate to the facet edge 124.

Additionally, waveguide elements 156 in the second level are vertically spaced from waveguide elements 152 in the first level by a suitable vertical distance that is selected to provide the optical mode having the chosen shape at or proximate to the facet edge 124; and waveguide elements 160 in the third level are vertically spaced from waveguide elements 156 in the second level by a suitable vertical distance that is selected to provide the optical mode having the chosen shape at or proximate to the facet edge 124.

Additionally, each of the waveguides 152, 156, and 160 has a suitable width and a suitable height that is selected to provide the optical mode having the chosen shape at or proximate to the facet edge 124.

Each of the waveguides 152, 156, and 160 comprises a suitable material such as SiN, Si, or another material suitable for implementing an optical waveguide.

Although a particular example 2-D array 140 of waveguide elements is shown in FIGS. 1A-B, the optical coupler 116 comprises other suitable 2-D arrays of waveguide elements in other embodiments, where the 2-D arrays 140 are structured to provide respective optical modes having respective chosen shapes at or proximate to the facet edge 124. Generally, the chosen shape of the optical mode of the 2-D array 140 is chosen to match a shape at or proximate to the facet edge 124 of an optical mode of the other optical component 132 in a manner that reduces coupling loss between the optical coupler 116 and the other optical component 132, and/or reduces alignment sensitivity with respect to the optical coupler 116 and the other optical component 132, at least in some embodiments.

Various alternative arrays of waveguide elements of an optical coupler are described below with respect to FIGS. 2A-32B. In various embodiments, each array described below with respect to FIGS. 2A-32B replaces the 2-D array 140 in the PIC 100, and the arrays described below with respect to FIGS. 2A-32B are described with reference to FIG. 1A for explanatory purposes. In other embodiments, the arrays described below with respect to FIGS. 2A-32B are utilized in an optical coupler of another suitable PIC different than the example PIC 100 of FIGS. 1A-B.

The arrays described below with respect to FIGS. 2A-32B comprise waveguide elements that are generally parallel to one another in a direction i) away from the facet edge and ii) generally parallel to the substrate 104. 2-D arrays described below with respect to FIGS. 2A-31B comprise a plurality of levels of waveguide elements. Some 2-D arrays described below include i) a first level of waveguide elements that is lowest among the plurality of levels with respect to the substrate 104 (i.e., the first level is closest to the substrate 104 amongst the plurality of levels); and ii) a second level of waveguide elements above the first level (and further from the substrate 104 as compared to the first level). Some 2-D arrays described below also include a third level of waveguide elements above the second level (and further from the substrate 104 as compared to the second level).

In the arrays described below with respect to FIGS. 2A-32B, numbers of waveguide elements used and cross-sectional arrangements of waveguide elements are selected to provide a chosen optical mode shape at or proximate to the facet edge 124, in some embodiments. Other factors are also selected to provide the chosen optical mode shape such as one or more of: i) vertical distances between waveguide elements in different levels; ii) lateral distances between adjacent waveguide elements in a same level; iii) a respective width of each waveguide element; and iv) a respective height of each waveguide element; v) a distance D by which one or more waveguide elements are set back from the facet edge 124, in various embodiments. Further factors are additionally or alternatively selected to provide the chosen optical mode shape such as one or more of: i) materials used for different waveguide elements in an array; ii) tapering of one or more waveguide elements in an array; iii) respective lengths of one or more waveguide elements as compared to respective lengths of one or more other waveguide elements in an array of waveguide elements, in various embodiments.

FIG. 2A is a simplified side view of another example 2-D array 200 of waveguide elements of an optical coupler as seen facing the facet edge 124, according to another embodiment. The 2-D array 200 includes a waveguide element 204 in a first level and a waveguide element 208 in a second level.

FIG. 2B is a simplified diagram 216 of a shape of an optical mode at the facet edge 124 corresponding to the 2-D array 200, according to another embodiment.

FIG. 3A is a simplified side view of another example 2-D array 300 of waveguide elements of an optical coupler as seen facing the facet edge 124, according to another embodiment. The 2-D array 300 includes waveguide elements 304 in a first level and a waveguide element 308 in a second level.

FIG. 3B is a simplified diagram 316 of a shape of an optical mode at the facet edge 124 corresponding to the 2-D array 300, according to another embodiment.

FIG. 4A is a simplified side view of another example 2-D array 400 of waveguide elements of an optical coupler as seen facing the facet edge 124, according to another embodiment. FIG. 4B is a simplified diagram 416 of a shape of an optical mode at the facet edge 124 corresponding to the 2-D array 400, according to another embodiment.

The 2-D array 400 is similar to the 2-D array 300 of FIG. 3A but the waveguide element 304-2 is set back from the facet edge 124 by a distance D. FIG. 4C is a simplified top view of the waveguide elements 304 of the 2-D array 400 showing the waveguide element 304-2 set back from the facet edge 124 by the distance D.

Because the waveguide element 304-2 is set back from the facet edge 124, an individual optical mode of the waveguide element 304-2 at the facet edge 124 is smaller as compared to an individual optical mode of the waveguide element 304-2 in the 2-D array 300 of FIG. 3A. As a result, a bottom center portion of the optical mode shape 416 is generally more flat or concave as compared to a bottom center portion of the optical mode shape 316 (FIG. 3B), which is more convex.

Waveguide elements arranged in the manner illustrated in FIG. 4C, i.e., comprising one or more first waveguide elements that extend to the facet edge 124 and one or more second waveguide elements set back from the facet edge 124 by a distance D, are sometimes referred to as a "trident" structure. A structure in which waveguide elements all extend to the facet edge 124, such as the waveguide elements 156 in FIG. 1A, is sometimes referred to as a "fork" structure. In some embodiments described herein, some waveguide elements of an optical coupler are arranged in a fork structure, whereas other waveguide elements of the optical coupler are arranged in a trident structure.

Figure 5A:
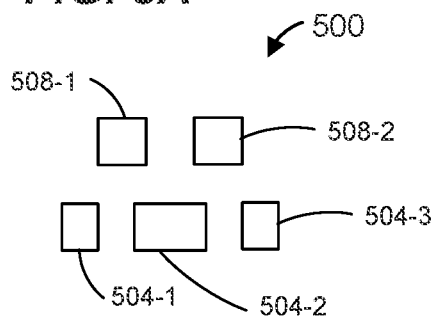
FIGS. 5A-32B are simplified side views of various other example 2-D arrays of waveguide elements that are used in the example PIC of FIG. 1A, according to various other embodiments.

FIG. 5A is a simplified side view of another example 2-D array 500 of waveguide elements of an optical coupler as seen facing the facet edge 124, according to another embodiment.

A first level of waveguide elements includes three waveguide elements 504, and a second level of waveguide elements includes two waveguide elements 508.

Figure 5B:
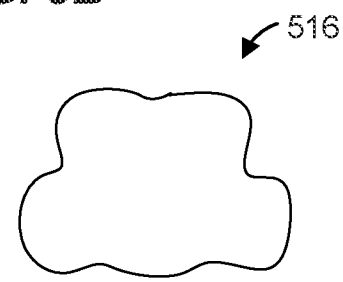

FIG. 5B is a simplified diagram 516 of a shape of an optical mode at the facet edge 124 corresponding to the 2-D array 500, according to another embodiment.

Figure 6A:
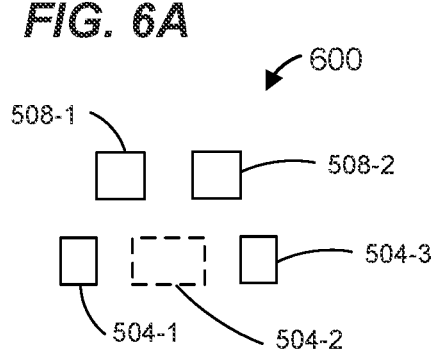
Figure 6B:
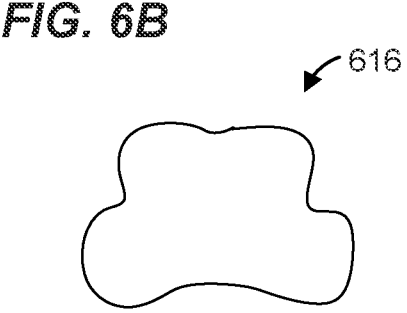

FIG. 6A is a simplified side view of another example 2-D array 600 of waveguide elements of an optical coupler as seen facing the facet edge 124, according to another embodiment. FIG. 6B is a simplified diagram 616 of a shape of an optical mode at the facet edge 124 corresponding to the 2-D array 600, according to another embodiment.

The 2-D array 600 is similar to the 2-D array 500 of FIG. 5A but the waveguide element 504-2 is set back from the facet edge 124 by a distance D in a manner similar to the waveguide 304-2 of FIG. 4C.

Because the waveguide element 504-2 is set back from the facet edge 124, an individual optical mode of the waveguide element 504-2 at the facet edge 124 is smaller as compared to an individual optical mode of the waveguide element 504-2 in the 2-D array 500 of FIG. 5A. As a result, a bottom center portion of the optical mode shape 616 is generally more flat or concave as compared to a bottom center portion of the optical mode shape 516 (FIG. 5B), which is more convex.

Figure 7A:
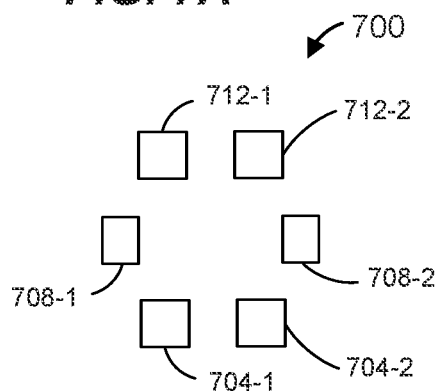

FIG. 7A is a simplified side view of another example 2-D array 700 of waveguide elements of an optical coupler as seen facing the facet edge 124, according to another embodiment.

A first level of waveguide elements includes two waveguide elements 704, a second level of waveguide elements includes two waveguide elements 708, and a third level of waveguide elements includes two waveguide elements 712.

Figure 7B:
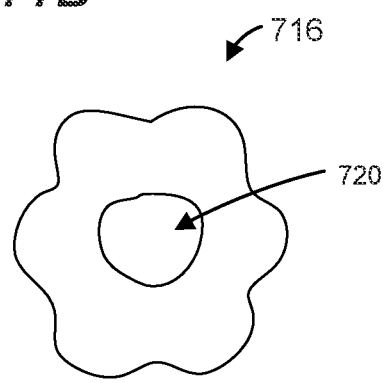

FIG. 7B is a simplified diagram 716 of a shape of an optical mode at the facet edge 124 corresponding to the 2-D array 700, according to another embodiment. The optical mode 716 includes an aperture 720.

Figure 8A:
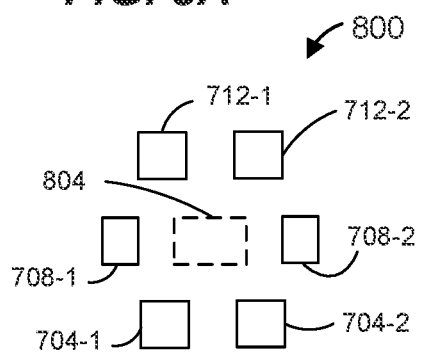
Figure 8B:
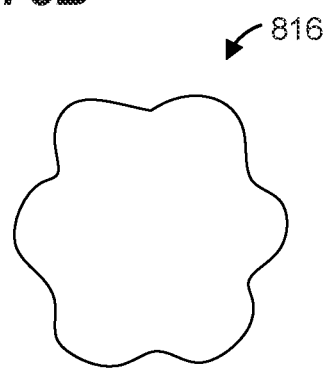

FIG. 8A is a simplified side view of another example 2-D array 800 of waveguide elements of an optical coupler as seen facing the facet edge 124, according to another embodiment. FIG. 8B is a simplified diagram 816 of a shape of an optical mode at the facet edge 124 corresponding to the 2-D array 800, according to another embodiment.

The 2-D array 800 is similar to the 2-D array 700 of FIG. 7A but the 2-D array 800 includes a waveguide element 804 in the second level between the waveguide elements 708. The waveguide element 804 is set back from the facet edge 124 by a distance D in a manner similar to the waveguide 304-2 of FIG. 4C. In another embodiment, the waveguide element 804 is not set back from the facet edge 124, i.e., the distance D is zero.

Because the 2-D array includes the waveguide element 804, the optical mode shape 816 does not include the aperture 720 of the optical mode shape 716 of FIG. 7B.

Figure 9A:
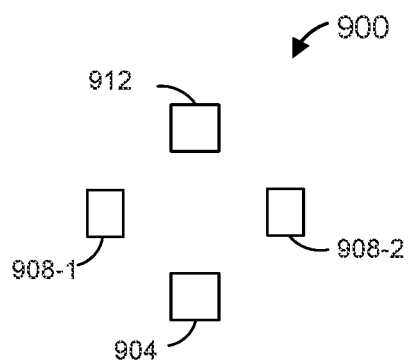

FIG. 9A is a simplified side view of another example 2-D array 900 of waveguide elements of an optical coupler as seen facing the facet edge 124, according to another embodiment.

A first level of waveguide elements includes a waveguide element 904, a second level of waveguide elements includes two waveguide elements 908, and a third level of waveguide elements includes a waveguide element 912.

Figure 9B:
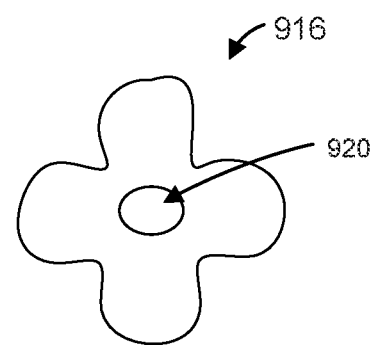

FIG. 9B is a simplified diagram 916 of a shape of an optical mode at the facet edge 124 corresponding to the 2-D array 900, according to another embodiment. The optical mode 916 includes an aperture 920.

Figure 10A:
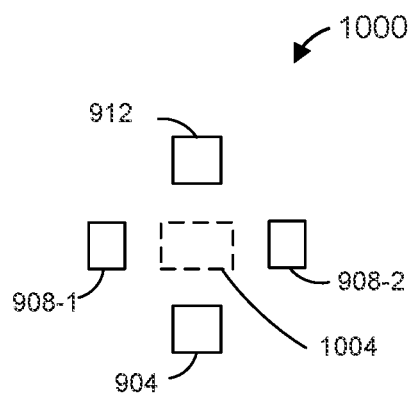
Figure 10B:
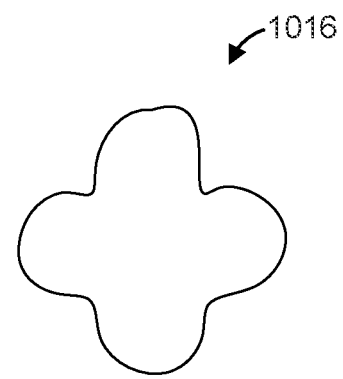

FIG. 10A is a simplified side view of another example 2-D array 1000 of waveguide elements of an optical coupler as seen facing the facet edge 124, according to another embodiment. FIG. 10B is a simplified diagram 1016 of a shape of an optical mode at the facet edge 124 corresponding to the 2-D array 1000, according to another embodiment.

The 2-D array 1000 is similar to the 2-D array 900 of FIG. 9A but the 2-D array 1000 includes a waveguide element 1004 in the second level between the waveguide elements 908. The waveguide element 1004 is set back from the facet edge 124 by a distance D in a manner similar to the waveguide 304-2 of FIG. 4C. In another embodiment, the waveguide element 1004 is not set back from the facet edge 124, i.e., the distance D is zero.

Because the 2-D array 1000 includes the waveguide element 1004, the optical mode shape 1016 does not include the aperture 920 of the optical mode shape 916 of FIG. 9B. Additionally, the circumference of optical mode shape 1016 is more rounded than the circumference of the optical mode shape 916, in an embodiment.

In some embodiments, all of the waveguide elements of the optical coupler described above with reference to FIGS. 1A-10B comprise a same suitable material such as SiN, Si, or another material suitable for implementing an optical waveguide. In other embodiments, one or more first waveguide elements of the optical coupler comprise a suitable first material such as one of SiN, Si, etc., and one or more second waveguide elements of the optical coupler comprise a suitable second material, different from the first material, such as another one of SiN, Si, etc. In some embodiments, the use of waveguide elements that comprise different materials affects a shape of a mode of an optical coupler, and thus the choice of material(s) of the waveguide elements is selected so that the optical coupler provides a chosen mode shape at or proximate to the facet edge 124. For example, in some embodiments, the different materials have different refractive indices, which affects a shape of a mode of an optical coupler.

Additionally, in some embodiments, the use of waveguide elements that comprise different materials affects a phase front shape of the mode of the optical coupler, and thus the choice of material(s) of the waveguide elements is selected so that the optical coupler provides a chosen phase front shape at or proximate to the facet edge 124. As an example, different material for different waveguide elements of the optical coupler are selected so that the optical coupler provides a chosen phase front shape at or proximate to the facet edge 124, according to some embodiments. For example, in some embodiments, the different materials have different refractive indices, which affects a phase front shape of the optical coupler. A generally convex phase front shape is chosen for optical focusing, in some embodiments. A generally concave phase front shape is chosen for optical focusing, in other embodiments. Optical focusing provided by an optical coupler is useful when interfacing with some lasers, at least in some embodiments.

In embodiments described below with reference to FIGS. 11A-31B, an optical coupler comprises plurality of levels of waveguide elements, including i) a first level of waveguide elements that is lowest among the plurality of levels with respect to the substrate 104 (i.e., the first level is closest to the substrate 104 amongst the plurality of levels); ii) a second level of waveguide elements above the first level (and further from the substrate 104 as compared to the first level); and, in some embodiments, a third level of elements above the second level (and further from the substrate 104 as compared to the second level). In the embodiments described below with reference to FIGS. 11A-31B, waveguide elements in the first level comprise Si, whereas the waveguide elements in level(s) above the first level comprise SiN. In other embodiments, waveguide elements in the first level comprises another suitable first material, and/or the waveguide elements in the other levels comprise another suitable second material that is different than the first material. In an embodiment, the first material has a higher refractive index than the second material. In another embodiment, the first material has a lower refractive index than the second material.

When the first material (e.g., Si) of the waveguide elements in the first level have a first refractive index that is higher than a second refractive index of a second material (e.g., SiN) of the waveguide elements in the other level(s) above the first level, individual optical modes of the waveguide elements in the first level at the facet edge 124 are smaller as compared to individual optical modes of the waveguide elements in the level(s) above the first level. As a result, bottom lobe(s) of the optical mode shape corresponding to the 2-D array are generally smaller as compared to lobes of the optical mode shape corresponding to waveguide elements in the levels above the first level.

Additionally, when the first material (e.g., Si) of the waveguide elements in the first level have a first refractive index that is higher than a second refractive index of a second material (e.g., SiN) of the waveguide elements in the other level(s) above the first level, a phase front of the mode corresponding to the 2-D array is generally concave, which has an optical focusing effect in some embodiments.

Figure 11A:
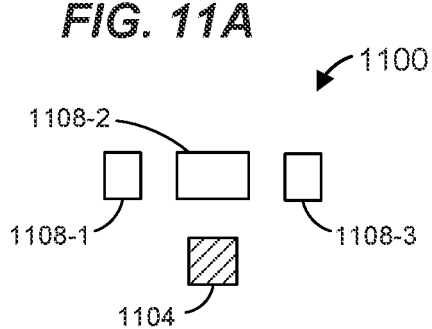

FIG. 11A is a simplified side view of another example 2-D array 1100 of waveguide elements of an optical coupler as seen facing the facet edge 124, according to another embodiment.

In the 2-D array 1100, the first level of waveguide elements includes a waveguide element 1104, and a second level of waveguide elements includes waveguide elements 1108.

Figure 11B:
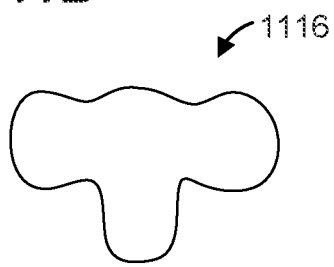

FIG. 11B is a simplified diagram 1116 of a shape of an optical mode at the facet edge 124 corresponding to the 2-D array 1100, according to another embodiment.

Because the material (e.g., Si) of the waveguide element 1104 has a first refractive index that is higher than a second refractive index of the second material (e.g., SiN) of the waveguide elements 1108, a bottom lobe of the optical mode shape 1116 is generally smaller as compared to sidelobes of the optical mode shape 1116.

Additionally, when a first material (e.g., Si) of the waveguide element 1104 has a first refractive index that is higher than a second refractive index of a second material (e.g., SiN) of the waveguide elements 1108, a phase front of the mode corresponding to the 2-D array 1100 is generally concave, which has an optical focusing effect in some embodiments.

Figure 12A:
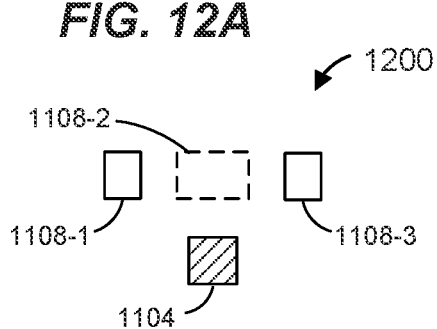
Figure 12B:
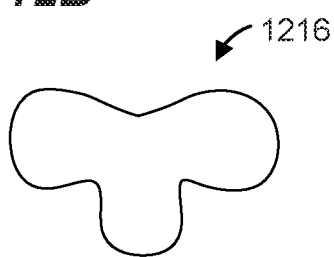

FIG. 12A is a simplified side view of another example 2-D array 1200 of waveguide elements of an optical coupler as seen facing the facet edge 124, according to another embodiment. FIG. 12B is a simplified diagram 1216 of a shape of an optical mode at the facet edge 124 corresponding to the 2-D array 1200, according to another embodiment.

The 2-D array 1200 is similar to the 2-D array 1100 of FIG. 11A but the waveguide element 1108-2 is set back from the facet edge 124 by a distance D in a manner similar to the waveguide 304-2 of FIG. 4C.

Because the waveguide element 1108-2 is set back from the facet edge 124, an individual optical mode of the waveguide element 1108-2 at the facet edge 124 is smaller as compared to an individual optical mode of the waveguide element 1108-2 in the 2-D array 1100 of FIG. 11A. As a result, a top center portion of the optical mode shape 1216 is generally more flat or concave as compared to a top center portion of the optical mode shape 1116 (FIG. 11B), which is more convex.

Figure 13A:
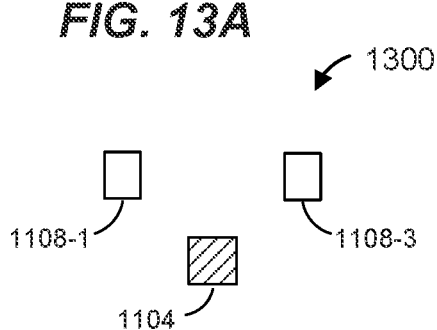
Figure 13B:
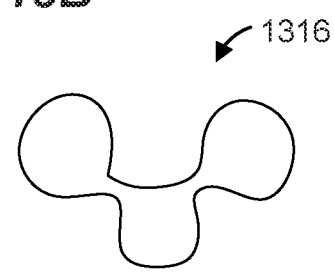

FIG. 13A is a simplified side view of another example 2-D array 1300 of waveguide elements of an optical coupler as seen facing the facet edge 124, according to another embodiment. FIG. 13B is a simplified diagram 1316 of a shape of an optical mode at the facet edge 124 corresponding to the 2-D array 1300, according to another embodiment.

The 2-D array 1300 is similar to the 2-D array 1100 of FIG. 11A but the waveguide element 1108-2 is omitted.

Figure 14A:
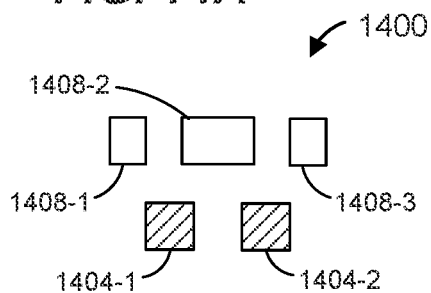

FIG. 14A is a simplified side view of another example 2-D array 1400 of waveguide elements of an optical coupler as seen facing the facet edge 124, according to another embodiment.

A first level of waveguide elements includes a waveguide element 1404, and a second level of waveguide elements includes waveguide elements 1408.

Figure 14B:
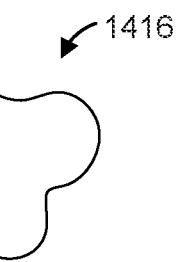

FIG. 14B is a simplified diagram 1416 of a shape of an optical mode at the facet edge 124 corresponding to the 2-D array 1400, according to another embodiment.

Because the material (e.g., Si) of the waveguide elements 1404 has a first refractive index that is higher than a second refractive index of the second material (e.g., SiN) of the waveguide elements 1408, bottom lobes of the optical mode shape 1116 are generally smaller as compared to sidelobes of the optical mode shape 1416.

Additionally, when a first material (e.g., Si) of the waveguide elements 1404 have a first refractive index that is higher than a second refractive index of a second material (e.g., SiN) of the waveguide elements 1408, a phase front of the mode corresponding to the 2-D array 1400 is generally concave, which has an optical focusing effect in some embodiments.

Figure 15A:
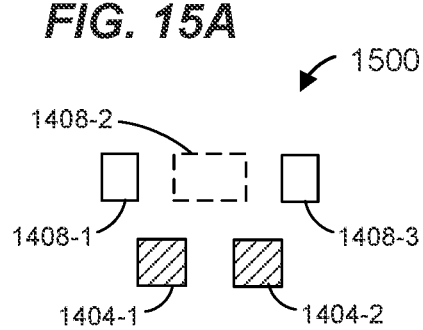
Figure 15B:
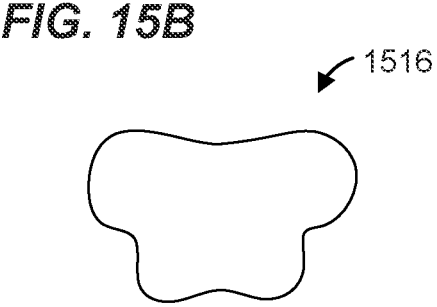

FIG. 15A is a simplified side view of another example 2-D array 1500 of waveguide elements of an optical coupler as seen facing the facet edge 124, according to another embodiment. FIG. 15B is a simplified diagram 1516 of a shape of an optical mode at the facet edge 124 corresponding to the 2-D array 1500, according to another embodiment.

The 2-D array 1500 is similar to the 2-D array 1400 of FIG. 14A but the waveguide element 1408-2 is set back from the facet edge 124 by a distance D in a manner similar to the waveguide 304-2 of FIG. 4C.

Because the waveguide element 1408-2 is set back from the facet edge 124, an individual optical mode of the waveguide element 1408-2 at the facet edge 124 is smaller as compared to an individual optical mode of the waveguide element 1408-2 in the 2-D array 1400 of FIG. 14A. As a result, a top center portion of the optical mode shape 1516 is generally more flat or concave as compared to a top center portion of the optical mode shape 1416 (FIG. 14B), which is more convex.

Figure 16A:
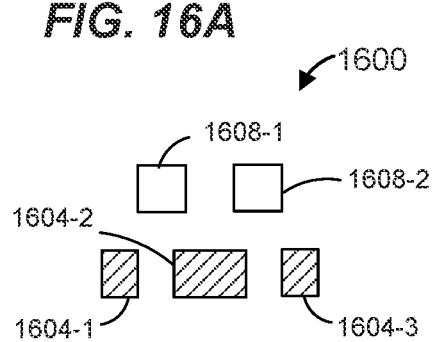

FIG. 16A is a simplified side view of another example 2-D array 1600 of waveguide elements of an optical coupler as seen facing the facet edge 124, according to another embodiment.

A first level of waveguide elements includes waveguide elements 1604, and a second level of waveguide elements includes waveguide elements 1608.

Figure 16B:
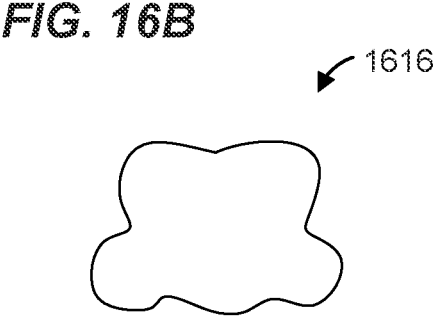

FIG. 16B is a simplified diagram 1616 of a shape of an optical mode at the facet edge 124 corresponding to the 2-D array 1600, according to another embodiment.

When a first material (e.g., Si) of the waveguide elements 1604 has a first refractive index that is higher than a second refractive index of a second material (e.g., SiN) of the waveguide elements 1608, individual optical modes of the waveguide elements 1604 at the facet edge 124 are smaller as compared to individual optical modes of the waveguide elements 1608. As a result, bottom lobes of the optical mode shape 1616 are generally smaller as compared to upper lobes of the optical mode shape 1616.

Additionally, when a first material (e.g., Si) of the waveguide elements 1604 has a first refractive index that is higher than a second refractive index of a second material (e.g., SiN) of the waveguide elements 1608, a phase front of the mode corresponding to the 2-D array 1600 is generally concave, which has an optical focusing effect in some embodiments.

Figure 17A:
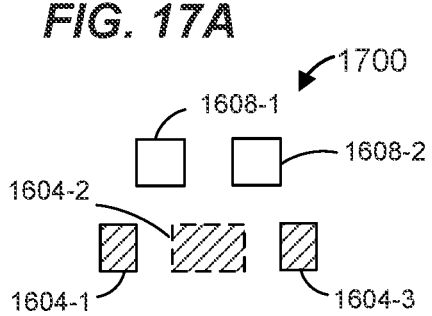
Figure 17B:
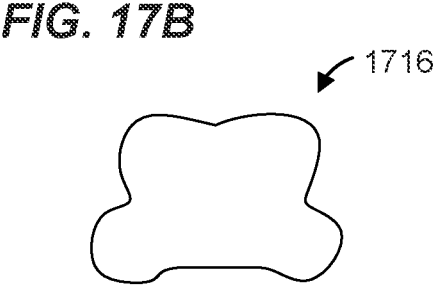

FIG. 17A is a simplified side view of another example 2-D array 1700 of waveguide elements of an optical coupler as seen facing the facet edge 124, according to another embodiment. FIG. 17B is a simplified diagram 1716 of a shape of an optical mode at the facet edge 124 corresponding to the 2-D array 1700, according to another embodiment.

The 2-D array 1700 is similar to the 2-D array 1600 of FIG. 16A but the waveguide element 1604-2 is set back from the facet edge 124 by a distance D in a manner similar to the waveguide 304-2 of FIG. 4C.

Because the waveguide element 1604-2 is set back from the facet edge 124, an individual optical mode of the waveguide element 1604-2 at the facet edge 124 is smaller as compared to an individual optical mode of the waveguide element 1604-2 in the 2-D array 1600 of FIG. 16A. As a result, a bottom center portion of the optical mode shape 1716 is generally more flat or concave as compared to a bottom center portion of the optical mode shape 1616 (FIG. 16B), which is more convex.

Figure 18A:
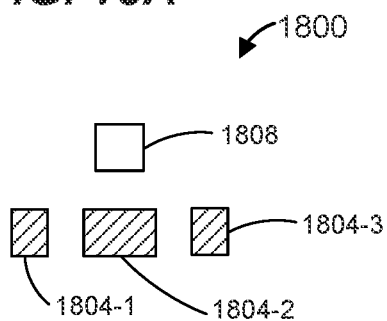

FIG. 18A is a simplified side view of another example 2-D array 1800 of waveguide elements of an optical coupler as seen facing the facet edge 124, according to another embodiment.

A first level of waveguide elements includes waveguide elements 1804, and a second level of waveguide elements includes waveguide elements 1808.

Figure 18B:
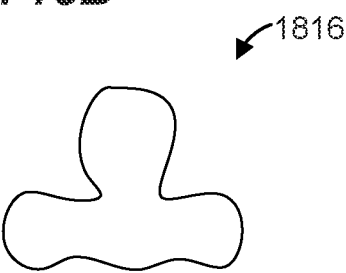

FIG. 18B is a simplified diagram 1816 of a shape of an optical mode at the facet edge 124 corresponding to the 2-D array 1800, according to another embodiment.

When a first material (e.g., Si) of the waveguide elements 1804 has a first refractive index that is higher than a second refractive index of a second material (e.g., SiN) of the waveguide element 1808, individual optical modes of the waveguide elements 1804 at the facet edge 124 are smaller as compared to an individual optical mode of the waveguide element 1808. As a result, bottom lobes of the optical mode shape 1816 are generally smaller as compared to upper lobes of the optical mode shape 1816.

Figure 19A:
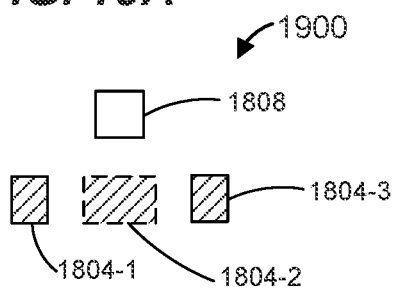
Figure 19B:
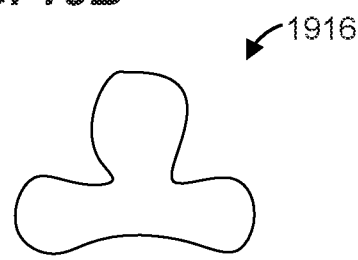

FIG. 19A is a simplified side view of another example 2-D array 1900 of waveguide elements of an optical coupler as seen facing the facet edge 124, according to another embodiment. FIG. 19B is a simplified diagram 1916 of a shape of an optical mode at the facet edge 124 corresponding to the 2-D array 1900, according to another embodiment.

The 2-D array 1900 is similar to the 2-D array 1800 of FIG. 18A but the waveguide element 1804-2 is set back from the facet edge 124 by a distance D in a manner similar to the waveguide 304-2 of FIG. 4C.

Because the waveguide element 1804-2 is set back from the facet edge 124, an individual optical mode of the waveguide element 1804-2 at the facet edge 124 is smaller as compared to an individual optical mode of the waveguide element 1804-2 in the 2-D array 1800 of FIG. 18A. As a result, a bottom center portion of the optical mode shape 1916 is generally more flat or concave as compared to a bottom center portion of the optical mode shape 1816 (FIG. 18B), which is more convex.

Figure 20A:
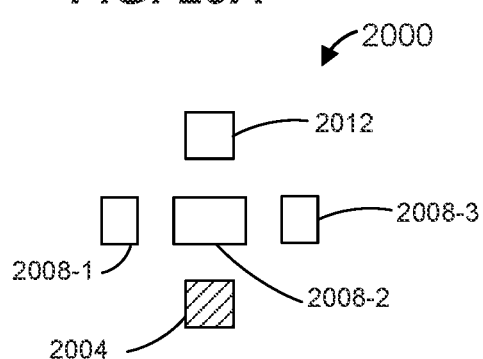

FIG. 20A is a simplified side view of another example 2-D array 2000 of waveguide elements of an optical coupler as seen facing the facet edge 124, according to another embodiment.

A first level of waveguide elements includes a waveguide element 2004, a second level of waveguide elements includes three waveguide elements 2008, and a third level of waveguide elements includes a waveguide element 2012.

Figure 20B:
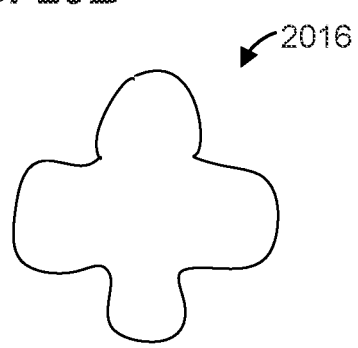

FIG. 20B is a simplified diagram 2016 of a shape of an optical mode at the facet edge 124 corresponding to the 2-D array 2000, according to another embodiment.

When a first material (e.g., Si) of the waveguide element 2004 has a first refractive index that is higher than a second refractive index of a second material (e.g., SiN) of the waveguide element 2008, an individual optical modes of the waveguide element 2004 at the facet edge 124 is smaller as compared to individual optical modes of the waveguide elements 2008. As a result, a bottom lobe of the optical mode shape 2016 is generally smaller as compared to upper lobes of the optical mode shape 2016.

Figure 21A:
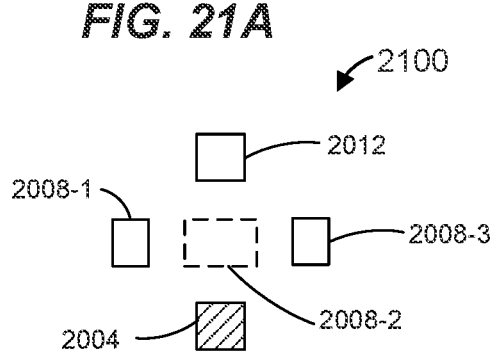
Figure 21B:
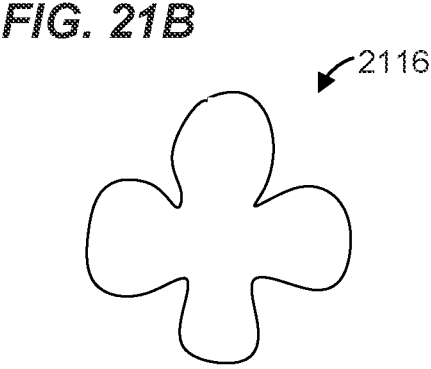

FIG. 21A is a simplified side view of another example 2-D array 2100 of waveguide elements of an optical coupler as seen facing the facet edge 124, according to another embodiment. FIG. 21B is a simplified diagram 2116 of a shape of an optical mode at the facet edge 124 corresponding to the 2-D array 2100, according to another embodiment.

The 2-D array 2100 is similar to the 2-D array 2000 of FIG. 20A but waveguide element 2008-2 is set back from the facet edge 124 by a distance D in a manner similar to the waveguide 304-2 of FIG. 4C. Because the waveguide element 2008-2 is set back from the facet edge 124, a circumference of the optical mode shape 2116 is less rounded than a circumference of the optical mode shape 2016, in an embodiment.

Figure 22A:
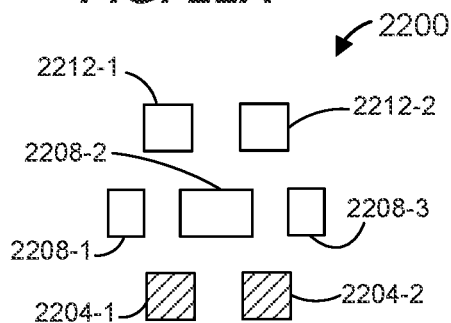

FIG. 22A is a simplified side view of another example 2-D array 2200 of waveguide elements of an optical coupler as seen facing the facet edge 124, according to another embodiment.

A first level of waveguide elements includes two waveguide elements 2204, a second level of waveguide elements includes three waveguide elements 2208, and a third level of waveguide elements includes two waveguide elements 2212.

Figure 22B:
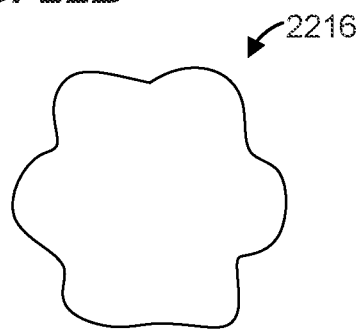

FIG. 22B is a simplified diagram 2216 of a shape of an optical mode at the facet edge 124 corresponding to the 2-D array 2200, according to another embodiment.

When a first material (e.g., Si) of the waveguide elements 2204 has a first refractive index that is higher than a second refractive index of a second material (e.g., SiN) of the waveguide elements 2208, 2212, individual optical modes of the waveguide element 2204 at the facet edge 124 are smaller as compared to individual optical modes of the waveguide elements 2208, 2212. As a result, bottom lobes of the optical mode shape 2216 are generally smaller as compared to upper lobes of the optical mode shape 2216.

Figure 23A:
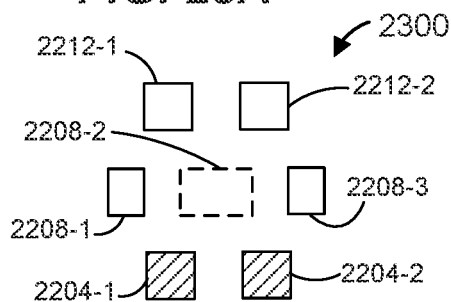
Figure 23B:
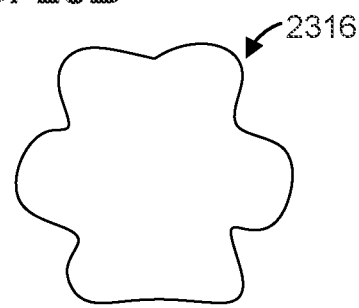

FIG. 23A is a simplified side view of another example 2-D array 2300 of waveguide elements of an optical coupler as seen facing the facet edge 124, according to another embodiment. FIG. 23B is a simplified diagram 2316 of a shape of an optical mode at the facet edge 124 corresponding to the 2-D array 2300, according to another embodiment.

The 2-D array 2300 is similar to the 2-D array 2200 of FIG. 22A but waveguide element 2208-2 is set back from the facet edge 124 by a distance D in a manner similar to the waveguide 304-2 of FIG. 4C. Because the waveguide element 2208-2 is set back from the facet edge 124, a circumference of the optical mode shape 2316 is less rounded than a circumference of the optical mode shape 2216, in an embodiment.

Figure 24A:
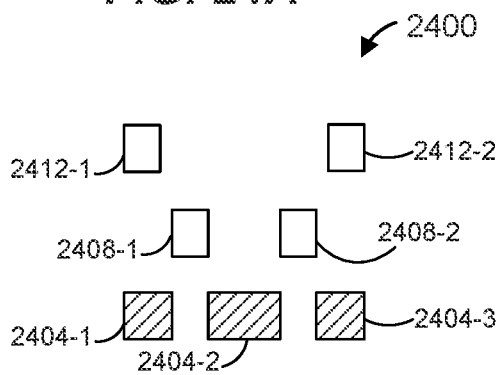

FIG. 24A is a simplified side view of another example 2-D array 2400 of waveguide elements of an optical coupler as seen facing the facet edge 124, according to another embodiment.

A first level of waveguide elements includes two waveguide elements 2404, a second level of waveguide elements includes three waveguide elements 2408, and a third level of waveguide elements includes two waveguide elements 2412.

Figure 24B:
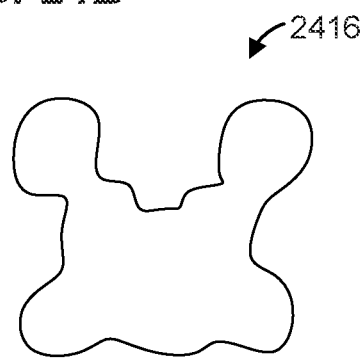

FIG. 24B is a simplified diagram 2416 of a shape of an optical mode at the facet edge 124 corresponding to the 2-D array 2400, according to another embodiment.

When a first material (e.g., Si) of the waveguide elements 2404 has a first refractive index that is higher than a second refractive index of a second material (e.g., SiN) of the waveguide elements 2408, 2412, individual optical modes of the waveguide element 2404 at the facet edge 124 are smaller as compared to individual optical modes of the waveguide elements 2408, 2412. As a result, bottom lobes of the optical mode shape 2416 are generally smaller as compared to upper lobes of the optical mode shape 2416.

Figure 25A:
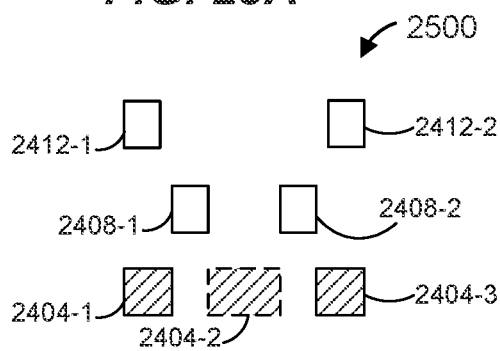
Figure 25B:
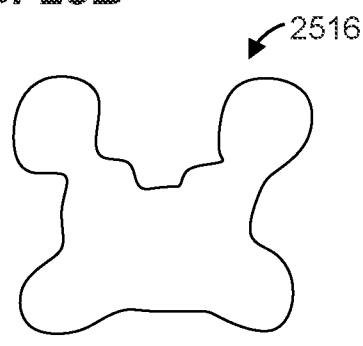

FIG. 25A is a simplified side view of another example 2-D array 2500 of waveguide elements of an optical coupler as seen facing the facet edge 124, according to another embodiment. FIG. 25B is a simplified diagram 2516 of a shape of an optical mode at the facet edge 124 corresponding to the 2-D array 2400, according to another embodiment.

The 2-D array 2500 is similar to the 2-D array 2400 of FIG. 24A but waveguide element 2404-2 is set back from the facet edge 124 by a distance D in a manner similar to the waveguide 304-2 of FIG. 4C. Because the waveguide element 2404-2 is set back from the facet edge 124, a bottom center portion of the optical mode shape 2516 is more flat or concave as compared to a bottom center portion of the optical mode shape 2416, in an embodiment.

Figure 26A:
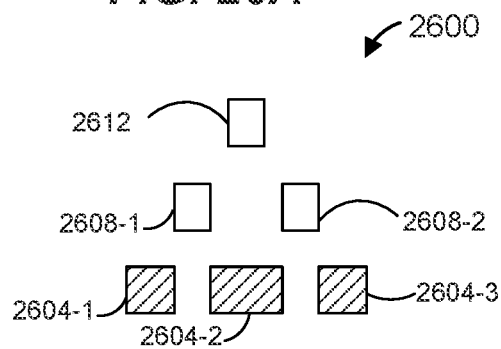

FIG. 26A is a simplified side view of another example 2-D array 2600 of waveguide elements of an optical coupler as seen facing the facet edge 124, according to another embodiment.

A first level of waveguide elements includes three waveguide elements 2604, a second level of waveguide elements includes two waveguide elements 2608, and a third level of waveguide elements includes a waveguide element 2612.

Figure 26B:

FIG. 26B is a simplified diagram 2616 of a shape of an optical mode at the facet edge 124 corresponding to the 2-D array 2600, according to another embodiment.

Figure 27A:
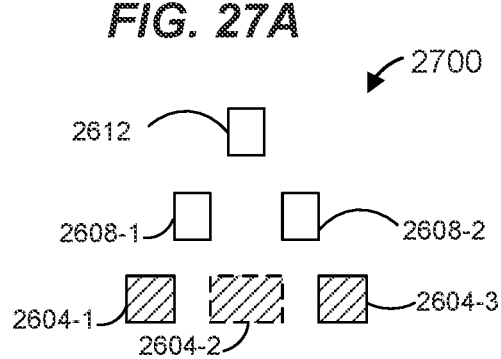
Figure 27B:

FIG. 27A is a simplified side view of another example 2-D array 2700 of waveguide elements of an optical coupler as seen facing the facet edge 124, according to another embodiment. FIG. 27B is a simplified diagram 2716 of a shape of an optical mode at the facet edge 124 corresponding to the 2-D array 2700, according to another embodiment.

The 2-D array 2700 is similar to the 2-D array 2600 of FIG. 26A but waveguide element 2604-2 is set back from the facet edge 124 by a distance D in a manner similar to the waveguide 304-2 of FIG. 4C. Because the waveguide element 2604-2 is set back from the facet edge 124, a bottom center portion of the optical mode shape 2716 is more flat or concave as compared to a bottom center portion of the optical mode shape 2616, in an embodiment.

Figure 28A:
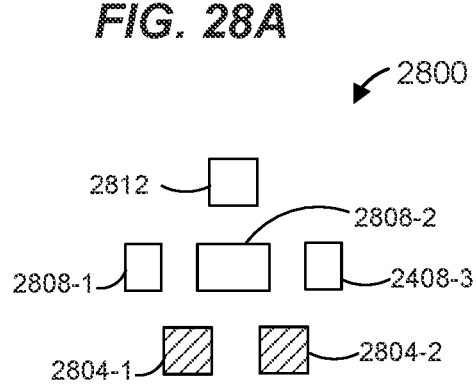

FIG. 28A is a simplified side view of another example 2-D array 2800 of waveguide elements of an optical coupler as seen facing the facet edge 124, according to another embodiment.

A first level of waveguide elements includes two waveguide elements 2804, a second level of waveguide elements includes three waveguide elements 2808, and a third level of waveguide elements includes a waveguide element 2812.

Figure 28B:

FIG. 28B is a simplified diagram 2816 of a shape of an optical mode at the facet edge 124 corresponding to the 2-D array 2800, according to another embodiment.

When a first material (e.g., Si) of the waveguide elements 2804 has a first refractive index that is higher than a second refractive index of a second material (e.g., SiN) of the waveguide elements 2808, 2812, individual optical modes of the waveguide element 2804 at the facet edge 124 are smaller as compared to individual optical modes of the waveguide elements 2808, 2812. As a result, bottom lobes of the optical mode shape 2816 are generally smaller as compared to upper lobes of the optical mode shape 2816.

Figure 29A:
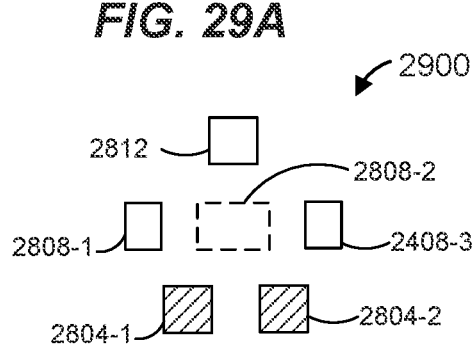
Figure 29B:

FIG. 29A is a simplified side view of another example 2-D array 2900 of waveguide elements of an optical coupler as seen facing the facet edge 124, according to another embodiment. FIG. 29B is a simplified diagram 2916 of a shape of an optical mode at the facet edge 124 corresponding to the 2-D array 2900, according to another embodiment.

The 2-D array 2900 is similar to the 2-D array 2800 of FIG. 28A but waveguide element 2808-2 is set back from the facet edge 124 by a distance D in a manner similar to the waveguide 304-2 of FIG. 4C. Because the waveguide element 2808-2 is set back from the facet edge 124, a circumference of the optical mode shape 2916 is less rounded as compared to a circumference of the optical mode shape 2816, in an embodiment.

Figure 30A:
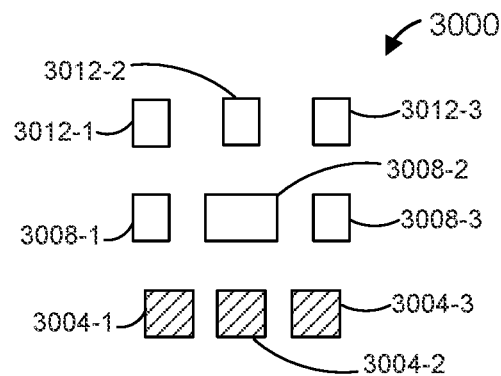

FIG. 30A is a simplified side view of another example 2-D array 3000 of waveguide elements of an optical coupler as seen facing the facet edge 124, according to another embodiment.

A first level of waveguide elements includes three waveguide elements 3004, a second level of waveguide elements includes three waveguide elements 3008, and a third level of waveguide elements includes three waveguide elements 3012.

Figure 30B:
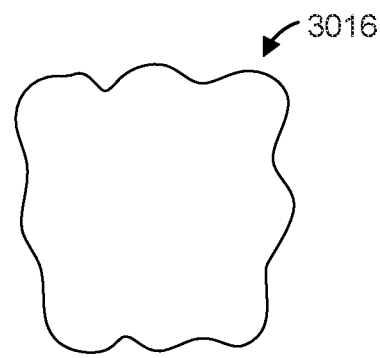

FIG. 30B is a simplified diagram 3016 of a shape of an optical mode at the facet edge 124 corresponding to the 2-D array 3000, according to another embodiment.

When a first material (e.g., Si) of the waveguide elements 3004 has a first refractive index that is higher than a second refractive index of a second material (e.g., SiN) of the waveguide elements 3008, 3012, individual optical modes of the waveguide elements 3004 at the facet edge 124 are smaller as compared to individual optical modes of the waveguide elements 3008, 3012. As a result, bottom lobes of the optical mode shape 3016 are generally smaller as compared to upper lobes of the optical mode shape 3016.

Figure 31A:
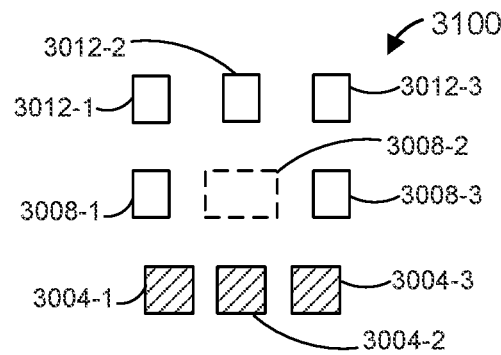
Figure 31B:
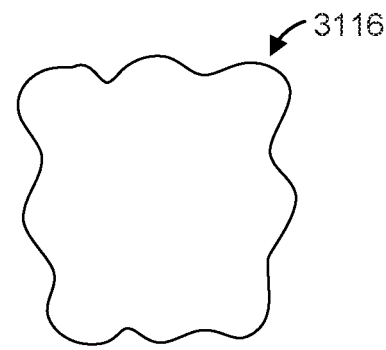

FIG. 31A is a simplified side view of another example 2-D array 3100 of waveguide elements of an optical coupler as seen facing the facet edge 124, according to another embodiment. FIG. 31B is a simplified diagram 3116 of a shape of an optical mode at the facet edge 124 corresponding to the 2-D array 3100, according to another embodiment.

The 2-D array 3100 is similar to the 2-D array 3000 of FIG. 30A but waveguide element 3008-2 is set back from the facet edge 124 by a distance D in a manner similar to the waveguide 304-2 of FIG. 4C.

Although embodiments of 2-D arrays of waveguide elements described above provide roughly left-right symmetric mode shapes at the facet edge 124, in other embodiments, other example arrays of waveguide elements provide optical mode shapes at the facet edge 124 that are asymmetric from left to right.

Figure 32A:
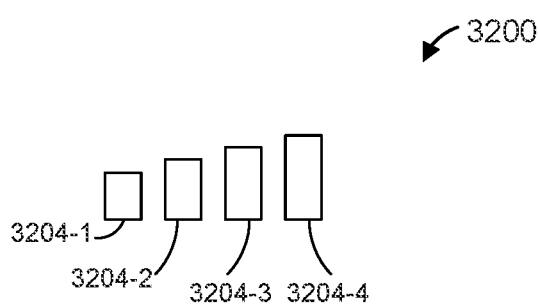

FIG. 32A is a simplified side view of another example array 3200 of waveguide elements of an optical coupler as seen facing the facet edge 124, according to another embodiment.

The array 3200 includes four waveguide elements 3204. Respective heights of the waveguide elements 3204 increase from left to right in FIG. 32A.

Figure 32B:

FIG. 32B is a simplified diagram 3216 of a shape of an optical mode at the facet edge 124 corresponding to the array 3200, according to another embodiment. The optical mode shape 3216 at the facet edge 124 is asymmetric from left to right. For example, a height of the mode shape 3216 generally increases from left to right in FIG. 32B.

In some embodiments, waveguide elements in arrays of waveguide elements such as described above include tapered waveguide elements. In other embodiments, waveguide elements in arrays of waveguide elements such as described above include straight waveguide elements. In other embodiments, waveguide elements in arrays of waveguide elements such as described above include one or more tapered waveguide elements and one or more straight waveguide elements.

Figure 33:
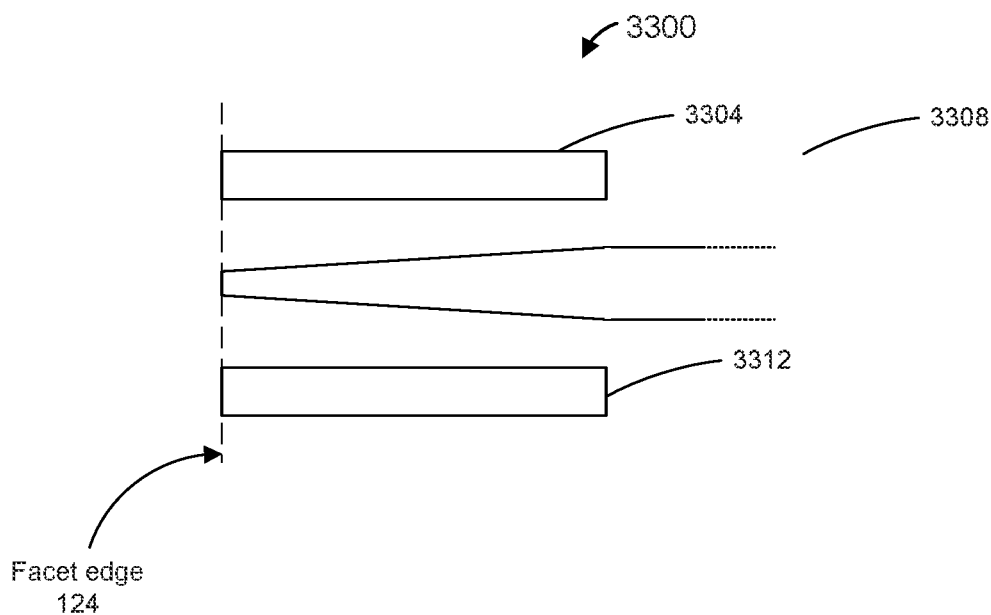
FIG. 33 is a simplified top view of an example set of waveguide elements within an optical coupler, according to an embodiment.

FIG. 33 is a simplified top view 3300 of three waveguide elements 3304, 3308, 3312 of an array of waveguide elements such as described herein, according to an embodiment. For example, the waveguide elements 3304, 3308, 3312 are included in 2-D arrays such as described above having three waveguide elements side by side in a single level within the 2-D array (e.g., such as in the 2-D arrays of FIGS. 3A-6A, 8A, 10A-12A, and 14A-31A), in various embodiments.

The waveguide elements 3304, 3312 are straight, whereas the waveguide element 3308 is tapered, with a narrow end of the waveguide element 3308 proximate to the facet edge 124. Light travelling away from the facet edge 124 (e.g., from left to right in FIG. 33) in the waveguide elements 3304, 3312 tends to migrate to the waveguide element 3308 when the waveguide elements 3304, 3312 end, in an embodiment. Similarly, light travelling towards the facet edge 124 (e.g., from right to left in FIG. 33) in the waveguide element 3308 tends to migrate to the waveguide elements 3304, 3312 when approaching right-most ends of the waveguide elements 3304, 3312.

Figure 34:
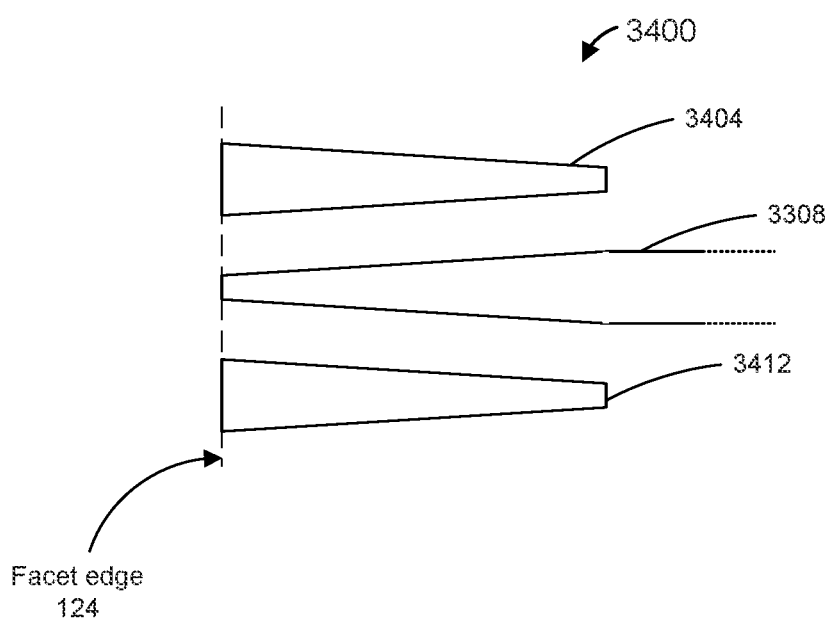
FIG. 34 is a simplified top view of another example set of waveguide elements within an optical coupler, according to another embodiment.

FIG. 34 is a top view 3400 of three waveguide elements 3404, 3408, 3412 of an array of waveguide elements such as described herein, according to an embodiment. For example, the waveguide elements 3404, 3408, 3412 are included in 2-D arrays such as described above having three waveguide elements side by side in a single level within the 2-D array (e.g., such as in the 2-D arrays of FIGS. 3A-6A, 8A, 10A-12A, and 14A-31A), in various embodiments.

All of the waveguide elements 3404, 3408, and 3412 are tapered. Respective wide ends of the waveguide elements

3404, 3412 are proximate to the facet edge 124, whereas a narrow end of the waveguide element 3408 is proximate to the facet edge 124. The narrowing of the waveguide elements 3404, 3412 (from left to right in FIG. 34) encourages light travelling away from the facet edge 124 (e.g., from left to right in FIG. 34) to migrate to the waveguide element 3308 by, in an embodiment. Similarly, narrow right-most ends of the waveguide elements 3304, 3312 encourages light travelling towards the facet edge 124 (e.g., from right to left in FIG. 33) in the waveguide element 3308 to migrate to the waveguide elements 3404, 3412 when approaching the right-most ends of the waveguide elements 3404, 3412, in an embodiment.

In some embodiments described above, an optical coupler includes a 2-D array of waveguide elements comprising different materials with different refractive indices, which causes light in one or more waveguide elements to travel slower as compared to light travelling in one or more other waveguide elements. Light travelling in one or more waveguide elements slower as compared to light travelling in one or more other waveguide elements affects a shape of a phase front at the facet edge 124 of the optical coupler, which has a focusing effect, in some embodiments.

In other embodiments, waveguide elements in the 2-D array are structured so that paths of light in different waveguide elements have different lengths, and thus it takes longer for light to travel in one or more waveguide elements as compared to light travelling in one or more other waveguide elements, which affects a shape of a phase front at the facet edge 124 of the optical coupler, and which has a focusing effect, in some embodiments.

Figure 35:
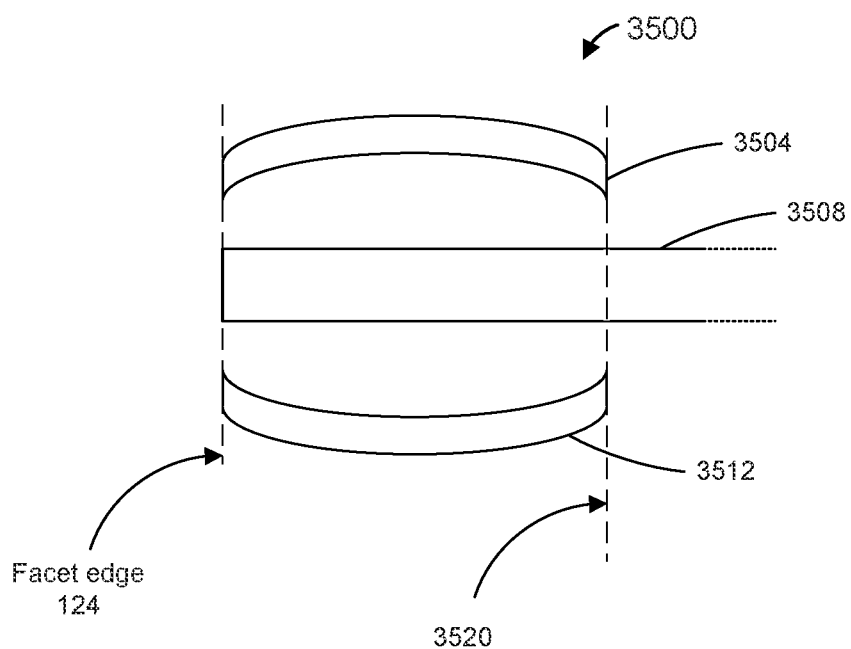
FIG. 35 is a simplified top view of another example set of waveguide elements within an optical coupler, according to another embodiment.

FIG. 35 is a top view 3500 of three waveguide elements 3504, 3508, 3512 of an array of waveguide elements such as described herein, according to an embodiment. For example, the waveguide elements 3504, 3508, 3512 are included in 2-D arrays such as described above having three waveguide elements side by side in a single level within the 2-D array (e.g., such as in the 2-D arrays of FIGS. 3A-6A, 8A, 10A-12A, and 14A-31A), in various embodiments.

All of the waveguide elements 3504, 3508, and 3512 comprise a suitable same material, such as Si, SiN, etc., in some embodiments. In other embodiments, one of the waveguide elements 3504, 3508, and 3512 comprises a suitable first material, such as Si, SiN, etc., and other ones of the waveguide elements 3504, 3508, and 3512 comprise a suitable second material different from the first material, such as another one of Si, SiN, etc., in some embodiments.

The waveguide elements 3504, 3512 are curved, whereas the waveguide element 3508 is straight. As a result, each of the paths from the facet edge 124 to a cross section 3520 of the PIC 100 via the waveguide elements 3504, 3512 is longer than the path from the facet edge 124 to the line 3520 via the waveguide element 3508. Thus, light travelling via the waveguide elements 3504, 3512 takes longer to travel between the facet edge 124 and the line 3512 as compared to light travelling via the waveguide element 3508 between the facet edge 124 and the line 3512.

Because light travelling via the waveguide elements 3504, 3512 takes longer to travel between the facet edge 124 and the line 3512 as compared to light travelling via the waveguide element 3508 between the facet edge 124 and the line 3512, a shape of a phase front at the facet edge 124 is generally concave from top to bottom in FIG. 35, which has a focusing effect, in some embodiments.

Figure 36:
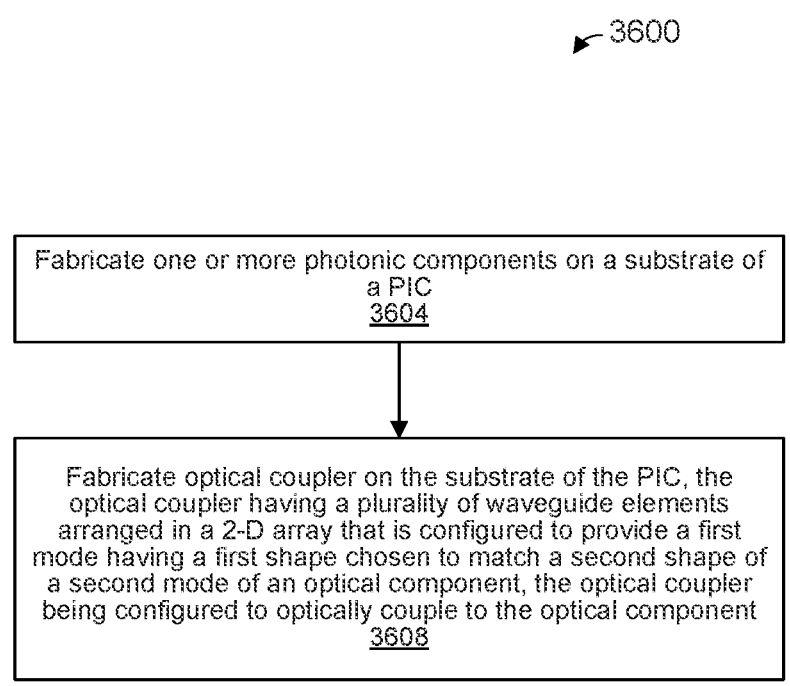
FIG. 36 is a flow diagram of an example method of manufacturing a PIC having an optical coupler, according to an embodiment.

FIG. 36 is a flow diagram of an example method 3600 of manufacturing a PIC having an optical coupler, according to an embodiment. The method 3600 is performed to manufacture any of the embodiments of PICS described herein, including the example PIC 100 of FIG. 1 with any of the example arrays of waveguide elements described herein, in various embodiments. In other embodiments, the method 3600 is performed to manufacture another suitable PIC with an optical coupler different than the PIC 100 of FIG. 1 and/or other suitable arrays of waveguide elements different than the example arrays of waveguide elements described herein.

At block 3604, one or more photonic components are fabricated on a substrate of the PIC. For example, the one or more photonic components 112 are fabricated on the substrate 104 of the PIC 100, in an embodiment. Fabricating the one or more photonic components at block 3604 comprises fabricating one of, or any suitable combination of two or more of, i) an optical multiplexer, ii) an optical demultiplexer, iii) an optical filter, iv) a P-I-N-type diode, v) an optical tuner, vi) one or more waveguides, etc., in various embodiments.

At block 3608, an optical coupler is fabricated on the substrate of the PIC, the optical coupler having a plurality of waveguide elements arranged in a 2-D array that is configured to provide a first mode having a first shape chosen to match a second shape of a second mode of an optical component, the optical coupler being configured to optically couple to the optical component. In an embodiment, fabricating the optical coupler on the substrate of the PIC comprises fabricating the example optical coupler 116 of FIG. 1A. In various other embodiments, fabricating the optical coupler on the substrate of the PIC comprises fabricating other example optical couplers having waveguide elements arranged in a 2-D array such as described with reference to FIGS. 2A-35.

In an embodiment, fabricating the optical coupler at block 3608 comprises fabricating the optical coupler to include a quantity of waveguide elements in the 2-dimensional array and ii) a cross-sectional arrangement of multiple waveguide elements in the 2-dimensional array chosen to provide the first mode having the first shape.

In another embodiment, the method 3600 further comprises fabricating a facet edge of the PIC; and fabricating the optical coupler at block 3608 comprises fabricating the 2-D array to include: a first set of one or more waveguide elements that extend to the facet edge, and a second set of one or more waveguide elements that are set back from the facet edge by a distance.

In another embodiment, the method 3600 further comprises fabricating a facet edge of the PIC; and fabricating the optical coupler at block 3608 comprises fabricating the 2-D array to include: a first waveguide element in a first layer, the first waveguide element comprising a straightened segment extending between the facet edge and a cross-section of the PIC at a distance from the facet edge, the first waveguide providing a first optical path between the facet edge and the cross-section of the PIC, the first optical path having a first length, and a second waveguide element in the first layer, the second waveguide element comprising a curved segment extending between the facet edge and the cross-section of the PIC, the second waveguide providing a second optical path having a second length longer than the first length.

In an embodiment, the second waveguide providing the second optical path having the second length longer than the first length provides a phase front of the optical coupler at the facet edge that is concave.

In another embodiment, fabricating the optical coupler at block 3608 comprises fabricating the 2-D array to include: a plurality of first waveguide elements in a first layer that is closest to the substrate among layer among multiple layers of waveguide elements of the optical coupler; and one or more second waveguide elements in a second layer, among the multiple layers, that is further from the substrate than the first layer.

In another embodiment, fabricating the optical coupler at block 3608 comprises fabricating the 2-D array to include: one or more first waveguide elements in a first layer that is closest to the substrate among layer among multiple layers of waveguide elements of the optical coupler; and one or more second waveguide elements in a second layer, among the multiple layers, that is further from the substrate than the first layer, wherein none of the second waveguide elements in the second layer is directly above, with reference to the substrate, any first waveguide elements in the first layer.

In another embodiment, fabricating the optical coupler at block 3608 comprises fabricating the 2-D array to include: one or more first waveguide elements in a first layer that is closest to the substrate among layer among multiple layers of waveguide elements of the optical coupler, the one or more first waveguide elements including a first material having a first refractive index; and one or more second waveguide elements in a second layer, among the multiple layers, that is further from the substrate than the first layer, wherein the one or more second waveguide elements include a second material different than the first material, the second material having a second refractive index that is lower than the first refractive index.

In another embodiment, fabricating the optical coupler at block 3608 comprises: fabricating the one or more first waveguide elements to include Si; and fabricating the one or more second waveguide elements to include a second material different than Si, the second material and having a second refractive index that is lower than the first refractive index of Si.

In another embodiment, fabricating the optical coupler at block 3608 comprises: fabricating the one or more second waveguide elements to include SiN.

In another embodiment, the method 3600 further comprises: optically coupling the optical coupler to one of i) a laser, and ii) an optical fiber; and wherein fabricating the optical coupler at block 3608 comprises fabricating the plurality of waveguide elements arranged in the 2-D array to provide the first mode having the first shape chosen to match the second shape of the one of i) the laser, and ii) the optical fiber.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A photonic integrated circuit (PIC), the PIC comprising:
    a facet edge; and
    a plurality of photonic components fabricated on the PIC, the plurality of photonic components including:
        an optical coupler configured to optically couple to an optical component, the optical coupler having a plurality of waveguide elements arranged in a 2-dimensional array that is configured to provide a first mode having a first shape chosen to match a second shape of a second mode of the optical component, the plurality of waveguide elements structured to provide respective paths of light in respective waveguide elements having different respective lengths to shape a phase front at the facet edge.

2. The PIC of claim 1, wherein i) a quantity of waveguide elements in the 2-dimensional array and ii) a cross-sectional arrangement of multiple waveguide elements in the 2-dimensional array are chosen to provide the first mode having the first shape.

3. The PIC of claim 1, wherein:
    the 2-dimensional array comprises:
        a first set of one or more waveguide elements that extend to the facet edge, and
        a second set of one or more waveguide elements that are set back from the facet edge by a distance.

4. The PIC of claim 1, wherein:
    the 2-dimensional array comprises:
        a first waveguide element in a first layer, the first waveguide element comprising a straightened segment extending between the facet edge and a cross-section within the PIC at a distance from the facet edge, the first waveguide providing a first optical path between the facet edge and the cross-section of the PIC, the first optical path having a first length, and
        a second waveguide element in the first layer, the second waveguide element comprising a curved segment extending between the facet edge and the cross-section within the PIC, the second waveguide providing a second optical path having a second length longer than the first length.

5. The PIC of claim 4, wherein the second length of the second waveguide being longer than the first length provides a phase front of the optical coupler at the facet edge that is concave.

6. The PIC of claim 1, wherein:
    the PIC further comprises a substrate; and
    the 2-dimensional array comprises:
        a plurality of first waveguide elements in a first layer that is closest to the substrate layer among multiple layers of waveguide elements of the optical coupler, and
        one or more second waveguide elements in a second layer, among the multiple layers, that is further from the substrate than the first layer.

7. The PIC of claim 1, wherein:
    the PIC further comprises a substrate; and
    the 2-dimensional array comprises:
        one or more first waveguide elements in a first layer that is closest to the substrate layer among multiple layers of waveguide elements of the optical coupler, and
        one or more second waveguide elements in a second layer, among the multiple layers, that is further from the substrate than the first layer, wherein none of the second waveguide elements in the second layer is directly above, with reference to the substrate, any first waveguide elements in the first layer.

8. The PIC of claim 1, wherein:
    the PIC further comprises a substrate; and
    the 2-dimensional array comprises:
        one or more first waveguide elements in a first layer that is closest to the substrate layer among multiple layers of waveguide elements of the optical coupler, the one or more first waveguide elements including a first material having a first refractive index, and
        one or more second waveguide elements in a second layer, among the multiple layers, that is further from the substrate than the first layer, wherein the one or more second waveguide elements include a second material different than the first material, the second material having a second refractive index that is lower than the first refractive index.

9. The PIC of claim 8, wherein:
the one or more first waveguide elements include Si; and
the one or more second waveguide elements include a second material different than Si, the second material and having a second refractive index that is lower than the first refractive index of Si.

10. The PIC of claim 9, wherein:
the one or more second waveguide elements include SiN.

11. The PIC of claim 1, wherein:
the optical component comprises one of i) a laser, and ii) an optical fiber; and
the plurality of waveguide elements are arranged in a 2-dimensional array that is configured to provide the first mode having the first shape chosen to match the second shape of the one of i) the laser, and ii) the optical fiber.

12. A method of manufacturing a photonic integrated circuit (PIC), the method comprising:
fabricating a photonic component on a substrate of the PIC; and
fabricating an optical coupler on the substrate of the PIC, the optical coupler being configured to optically couple to an optical component, the optical coupler having a plurality of waveguide elements arranged in a 2-dimensional (2-D) array that is configured to provide a first mode having a first shape chosen to match a second shape of a second mode of the optical component, the fabricating the optical coupler comprising structuring the plurality of waveguide elements to provide respective paths of light in respective waveguide elements having different respective lengths to shape a phase front at a facet edge of the PIC.

13. The method of manufacturing the PIC of claim 12, wherein fabricating the optical coupler comprises:
fabricating the optical coupler to include a quantity of waveguide elements in the 2-dimensional array and ii) a cross-sectional arrangement of multiple waveguide elements in the 2-dimensional array chosen to provide the first mode having the first shape.

14. The method of manufacturing the PIC of claim 12, further comprising:
fabricating the facet edge of the PIC; and
wherein fabricating the optical coupler comprises fabricating the 2-D array to include:
a first set of one or more waveguide elements that extend to the facet edge, and
a second set of one or more waveguide elements that are set back from the facet edge by a distance.

15. The method of manufacturing the PIC of claim 12, further comprising:
fabricating the facet edge of the PIC; and
wherein fabricating the optical coupler comprises fabricating the 2-D array to include:
a first waveguide element in a first layer, the first waveguide element comprising a straightened segment extending between the facet edge and a cross-section within the PIC at a distance from the facet edge, the first waveguide providing a first optical path between the facet edge and the cross-section within the PIC, the first optical path having a first length, and
a second waveguide element in the first layer, the second waveguide element comprising a curved segment extending between the facet edge and the cross-section within the PIC, the second waveguide providing a second optical path having a second length longer than the first length.

16. The method of manufacturing the PIC of claim 15, wherein the second length of the second waveguide being longer than the first length provides a phase front of the optical coupler at the facet edge that is concave.

17. The method of manufacturing the PIC of claim 12, wherein fabricating the optical coupler comprises fabricating the 2-D array to include:
a plurality of first waveguide elements in a first layer that is closest to the substrate layer among multiple layers of waveguide elements of the optical coupler; and
one or more second waveguide elements in a second layer, among the multiple layers, that is further from the substrate than the first layer.

18. The method of manufacturing the PIC of claim 12, wherein fabricating the optical coupler comprises fabricating the 2-D array to include:
one or more first waveguide elements in a first layer that is closest to the substrate layer among multiple layers of waveguide elements of the optical coupler; and
one or more second waveguide elements in a second layer, among the multiple layers, that is further from the substrate than the first layer, wherein none of the second waveguide elements in the second layer is directly above, with reference to the substrate, any first waveguide elements in the first layer.

19. The method of manufacturing the PIC of claim 12, wherein fabricating the optical coupler comprises fabricating the 2-D array to include:
one or more first waveguide elements in a first layer that is closest to the substrate layer among multiple layers of waveguide elements of the optical coupler, the one or more first waveguide elements including a first material having a first refractive index; and
one or more second waveguide elements in a second layer, among the multiple layers, that is further from the substrate than the first layer, wherein the one or more second waveguide elements include a second material different than the first material, the second material having a second refractive index that is lower than the first refractive index.

20. The method of manufacturing the PIC of claim 19, wherein fabricating the optical coupler comprises:
fabricating the one or more first waveguide elements to include Si; and
fabricating the one or more second waveguide elements to include a second material different than Si, the second material and having a second refractive index that is lower than the first refractive index of Si.

21. The method of manufacturing the PIC of claim 20, wherein fabricating the optical coupler comprises:
fabricating the one or more second waveguide elements to include SiN.

22. The method of manufacturing the PIC of claim 12, further comprising:
optically coupling the optical coupler to one of i) a laser, and ii) an optical fiber; and
wherein fabricating the optical coupler comprises fabricating the plurality of waveguide elements arranged in the 2-D array to provide the first mode having the first shape chosen to match the second shape of the one of i) the laser, and ii) the optical fiber.

* * * * *